(12) United States Patent
Lewandowski et al.

(10) Patent No.: US 12,103,514 B2
(45) Date of Patent: Oct. 1, 2024

(54) OFF-ROAD FEATURE ENABLEMENT

(71) Applicant: Ford Global Technologies, LLC, Dearborn, MI (US)

(72) Inventors: Andrew Denis Lewandowski, Sterling Heights, MI (US); Keith Weston, Canton, MI (US); Jordan Barrett, Milford, MI (US); Brendan Francis Diamond, Grosse Pointe, MI (US); Michael Alan Mcnees, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 17/839,515

(22) Filed: Jun. 14, 2022

(65) Prior Publication Data
US 2023/0398978 A1    Dec. 14, 2023

(51) Int. Cl.
*B60W 30/02* (2012.01)
*B60G 21/10* (2006.01)
(Continued)

(52) U.S. Cl.
CPC .......... *B60W 30/02* (2013.01); *B60G 21/106* (2013.01); *B60R 16/037* (2013.01); *B60W 10/20* (2013.01); *B60W 10/22* (2013.01); *B62D 11/02* (2013.01); *B60G 2400/204* (2013.01); *B60G 2400/821* (2013.01); *B60G 2401/14* (2013.01); *B60G 2401/22* (2013.01); *B60W 2420/403* (2013.01); *B60W 2552/30* (2020.02);
(Continued)

(58) Field of Classification Search
CPC ...... B60W 30/02; B60W 10/20; B60W 10/22; B60W 2420/403; B60W 2552/30; B60W 2552/35; B60W 2556/40; B60W 2556/65; B60G 21/106; B60G 2400/204; B60G 2400/821; B60G 2401/14; B60G 2401/22; B60R 16/037; B62D 11/02; B62D 6/007; B62D 7/1509
See application file for complete search history.

(56) References Cited

U.S. PATENT DOCUMENTS

6,356,837 B1 * 3/2002 Yokota .................. G01C 21/34
701/461
6,481,732 B1 * 11/2002 Hawkins ............ B60G 17/0162
280/124.106
(Continued)

*Primary Examiner* — Phutthiwat Wongwian
*Assistant Examiner* — Susan E Scharpf
(74) *Attorney, Agent, or Firm* — Frank A. Mackenzie; Bejin Bieneman PLC (57) ABSTRACT

A method and apparatus for providing an off-road feature of a vehicle includes determining that the vehicle is in an off-road area based upon a location of the vehicle and sensed terrain characteristics at the location. Upon determining that the vehicle is in the off-road area, the vehicle monitors parameters for enablement of the off-road feature of the vehicle. The off-road feature is enabled in response to the parameters being within a predetermined range based upon a number of transitions between an enabled state and a disabled state within a predetermined time being less than a transition threshold. Parameter monitoring for enablement of the off-road feature is ceased upon determining that the vehicle has moved from the off-road area to an on-road area.

20 Claims, 6 Drawing Sheets

(51) Int. Cl.
- *B60R 16/037* (2006.01)
- *B60W 10/20* (2006.01)
- *B60W 10/22* (2006.01)
- *B62D 6/00* (2006.01)
- *B62D 7/15* (2006.01)
- *B62D 11/02* (2006.01)

(52) U.S. Cl.
CPC ..... *B60W 2552/35* (2020.02); *B60W 2556/40* (2020.02); *B60W 2556/65* (2020.02); *B62D 6/007* (2013.01); *B62D 7/1509* (2013.01)

(56) References Cited

U.S. PATENT DOCUMENTS

| | | | | |
|---|---|---|---|---|
| 8,118,314 B2* | 2/2012 | Ersoy | .............. | B60G 21/0556 |
| | | | | 280/124.152 |
| 11,097,590 B2* | 8/2021 | Simula | ............. | B60G 17/0162 |
| 2004/0195013 A1* | 10/2004 | Spark | .............. | B62D 9/00 |
| | | | | 180/6.24 |
| 2005/0217906 A1* | 10/2005 | Spark | .............. | B62D 9/00 |
| | | | | 180/22 |
| 2007/0032913 A1* | 2/2007 | Ghoneim | ........... | B60W 40/10 |
| | | | | 701/1 |
| 2009/0140887 A1* | 6/2009 | Breed | ............. | G01C 21/1656 |
| | | | | 701/116 |
| 2010/0191461 A1* | 7/2010 | Zeng | ............. | G01S 13/931 |
| | | | | 701/532 |
| 2010/0332068 A1* | 12/2010 | Dorenkamp | ....... | G05D 1/027 |
| | | | | 701/31.4 |
| 2012/0158243 A1* | 6/2012 | Pupin | ............. | H04N 7/181 |
| | | | | 348/148 |
| 2018/0001895 A1* | 1/2018 | Fairgrieve | ......... | B60W 10/22 |
| 2018/0356798 A1* | 12/2018 | Ciovnicu | ......... | B60C 23/00372 |
| 2021/0188332 A1* | 6/2021 | Brooks | ............ | G05D 1/021 |
| 2021/0370940 A1 | 12/2021 | Tejeda et al. | | |
| 2021/0396279 A1* | 12/2021 | Baskin | ............. | F16D 48/066 |

* cited by examiner

OFF-ROAD FEATURE ENABLEMENT

BACKGROUND

Recently, off-road vehicles have begun offering off-road features such as stabilizer bar disconnects, crab modes, tank turn modes, and the like. Such off-road features are engaged by a user selection of the off-road feature or selection of a drive mode that includes the off-road feature (e.g., selecting rock crawl mode enables a stabilizer bar disconnect) and are automatically disabled above a pre-set speed. Additionally, vehicles are increasingly being equipped with multiple sensors (GPS, cameras, LiDAR, short range RADAR, ultrasonic parking assist sensors, etc.) for advanced driver assistance systems (ADAS).

DETAILED DESCRIPTION

The present disclosure leverages ADAS sensors to automatically enable and disable an off-road feature, such as a stabilizer bar disconnect, in a manner that increases occupant comfort without causing occupant annoyance or increased wear on components by limiting the number of transitions between enabled and disabled states to a predetermined number within a predetermined period of time (e.g., 5 times within 30 minutes). Additionally, the provision of such features to vehicles not traditionally used in off-road areas (2-wheel drive, crossover SUVs) may expand their capabilities. The present disclosure effectively geofences the automatic enablement of off-road features to off-road areas, and only under specific conditions limited to the monitored parameters (speed, curve radius, etc.), so that an off-road feature will not inadvertently be enabled during use on paved roads.

In an implementation, a computing device for a vehicle may have a processor and a memory, the memory storing instructions executable by the processor, the instructions including instructions to initiate detection of parameters for enablement of an off-road feature of the vehicle upon determining that the vehicle is in an off-road area, enable the off-road feature in response to the parameters being within a predetermined range based upon a number of transitions between an enabled state and a disabled state within a predetermined time period being less than a transition threshold, and cease detection of the parameters for enablement of the off-road feature upon determining that the vehicle has moved from the off-road area to an on-road area.

In one example, the instructions may determine that the vehicle is in an off-road area based upon a location of the vehicle and sensed terrain characteristics at the location.

In an implementation, the off-road feature may be a stabilizer bar disconnect, and the instructions may enable the stabilizer bar disconnect based upon the parameters of a speed of the vehicle and a radius of an off-road track in front of the vehicle.

In an example, the radius of the off-road track in front of the vehicle may be determined by a camera and/or a digital map.

In another example, the sensed terrain characteristics at the location may be from at least one of a camera on the vehicle, a short range radar on the vehicle, an ultrasonic sensor on the vehicle, and/or vehicle to vehicle (V2V) or vehicle to infrastructure (V2X) data from another vehicle.

In another implementation, the off-road feature may be a tank turn mode or a crab mode, and the instructions may enable the tank turn mode or crab mode based upon a speed of the vehicle, a radius of an off-road track in front of the vehicle, and obstacles in the off-road track.

In an example, the radius of the off-road track in front of the vehicle may be determined by a camera and/or a digital map.

In another example, the obstacles in the off-road track may be determined by object detection from at least one of a camera on the vehicle, an ultrasonic sensor on the vehicle, and/or vehicle to vehicle (V2V) or vehicle to infrastructure (V2X) data from another vehicle.

In an example, the instructions may disable the off-road feature in response to the parameters being outside the predetermined range.

In a further example, the instructions may reset the number of transitions between an enabled state and a disabled state and a timer for the predetermined time upon an expiration of the predetermined time or upon determining the vehicle has moved from an on-road area to an off-road area.

In another implementation of the present disclosure, a method for providing an off-road feature of a vehicle may include initiating detection of parameters for enablement of the off-road feature of the vehicle upon determining that the vehicle is in an off-road area, enabling the off-road feature in response to the parameters being within a predetermined range based upon a number of transitions between an enabled state and a disabled state within a predetermined time being less than a transition threshold, and ceasing detection of the parameters for enablement of the off-road feature upon determining that the vehicle has moved from the off-road area to an on-road area.

In one example, the method may include determining that the vehicle is in the off-road area based upon a location of the vehicle and sensed terrain characteristics at the location.

In another example, the off-road feature may be a stabilizer bar disconnect, and the method may include enabling the stabilizer bar disconnect based upon the parameters of a speed of the vehicle and a radius of an off-road track in front of the vehicle.

In an example, determining the radius of the off-road track in front of the vehicle may be done with a camera and/or a digital map.

In an implementation, the sensed terrain characteristics at the location may be from at least one of a camera on the vehicle, a short range radar on the vehicle, an ultrasonic sensor on the vehicle, and/or vehicle to vehicle (V2V) or vehicle to infrastructure (V2X) data from another vehicle.

In another implementation, the off-road feature may be a tank turn mode or a crab mode, and the method may include enabling the tank turn mode or crab mode based upon a speed of the vehicle, a radius of an off-road track in front of the vehicle, and obstacles in the off-road track.

In an example, determining the radius of the off-road track in front of the vehicle may be done with a camera and/or a digital map.

In another example, sensing the obstacles in the off-road track may be done with at least one of a camera on the vehicle, an ultrasonic sensor on the vehicle, and/or vehicle to vehicle (V2V) or vehicle to infrastructure (V2X) data from another vehicle.

The method may also include disabling the off-road feature in response to the parameters being outside the predetermined range.

In another example, the method may include resetting the number of transitions between an enabled state and a disabled state and a timer for the predetermined time upon an expiration of the predetermined time or upon determining the vehicle has moved from an on-road area to an off-road area.

Figure 1:
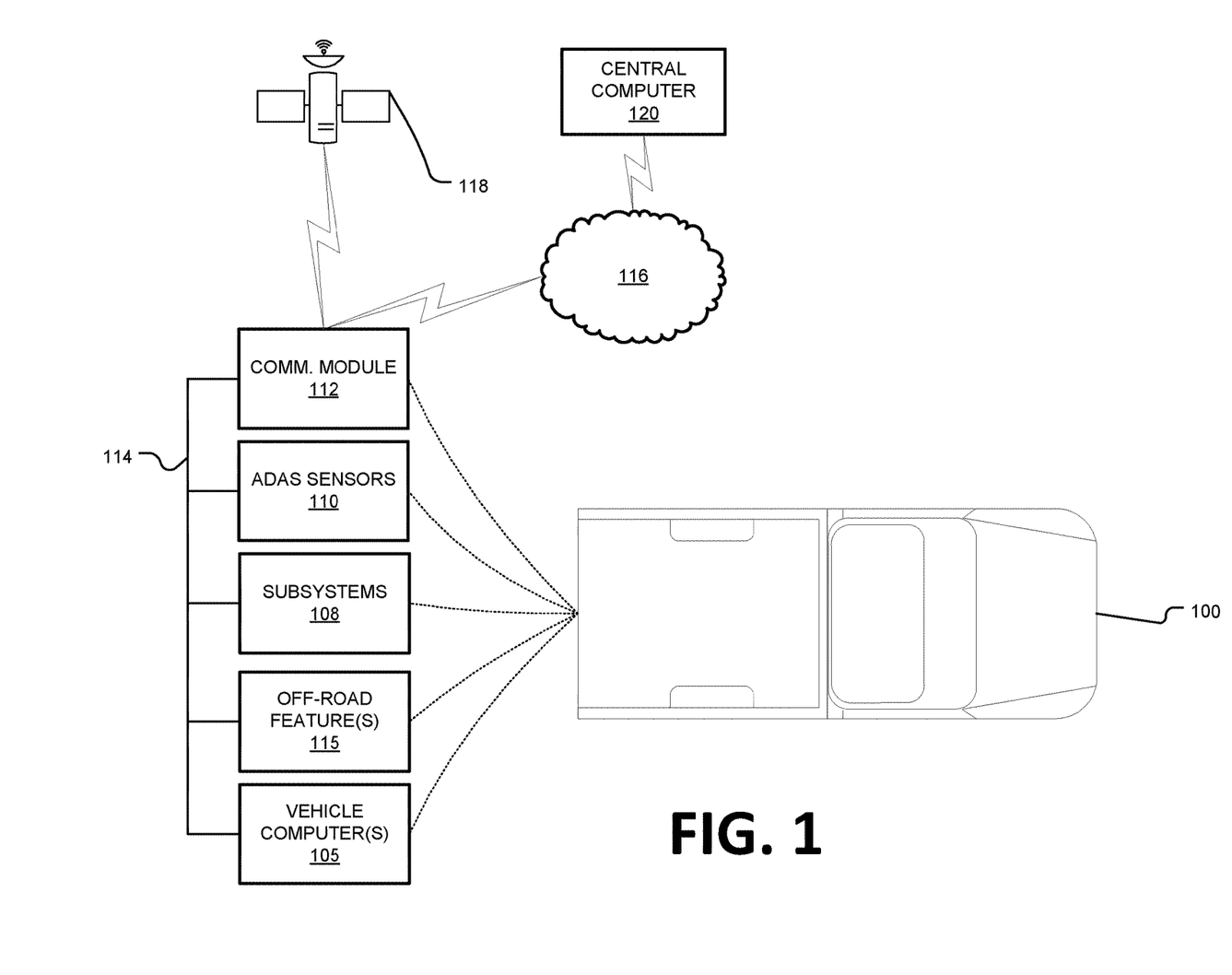
FIG. 1 is a diagram of an example system for enabling an off-road feature.

With reference to FIG. 1, a connected system is shown that can provide communications between a vehicle 100, one or more Global Positioning System (GPS) satellites 118, and a central computer 120 to provide a connected environment for the vehicle 100.

Vehicle 100 is a set of components or parts, including hardware components and typically also software and/or programming, to perform a function or set of operations in the vehicle 100. Vehicle subsystems 108 typically include a braking system, a propulsion system, and a steering system as well as other subsystems including but not limited to a body control system, a climate control system, an advanced driver assistance system (ADAS), a lighting system, and a human-machine interface (HMI) system, which may include an instrument panel and/or infotainment system. The propulsion subsystem converts energy to rotation of vehicle 100 wheels to propel the vehicle 100 forward and/or backward. The braking subsystem can slow and/or stop vehicle 100 movement. The steering subsystem can control a yaw, e.g., turning left and right, maintaining a straight path, of the vehicle 100 as it moves.

Computers, including the herein-discussed one or more vehicle computers 105 in the form of electronic control units (ECUs) and central computer 120, include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of a computer 105. The memory can be a separate device from the computer, and the computer can retrieve information stored in the memory, e.g., one or more vehicle computers 105 can obtain data to be stored via a vehicle network 114 in the vehicle 100, e.g., over an Ethernet bus, a CAN bus, a wireless network, etc. Alternatively, or additionally, the memory can be part of the computer, i.e., as a memory of the computer or firmware of a programmable chip.

The one or more vehicle computers 105 can be included in a vehicle 100 that may be any suitable type of ground vehicle 100, e.g., a passenger or commercial automobile such as a sedan, a coupe, a truck, a sport utility, a crossover, a van, a minivan, etc. which may include an off-road feature. For purposes of this disclosure, vehicle 100 is illustrated as a pickup truck. A vehicle computer 105 may include programming to operate one or more of vehicle 100's brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer, as opposed to a human operator, is to control such operations, such as by sending vehicle data over the vehicle network 114. Additionally, a vehicle computer 105 may be programmed to determine whether and when a human operator is to control such operations.

A vehicle computer 105, such as an ECU, may include or be communicatively coupled to, e.g., via a vehicle network 114, such as a communications bus as described further below, more than one processor, e.g., included in components such as actuators, ADAS sensors 110, electronic controller units (ECUs) or the like included in the vehicle 100 for monitoring and/or controlling various vehicle components, e.g., a powertrain controller, a brake controller, a steering controller, etc. The vehicle computers 105 are generally arranged for communications on a vehicle communication network 114 that can include a bus in the vehicle 100, such as Ethernet (IEEE 802.3), a controller area network (CAN) or the like, and/or other wired and/or wireless mechanisms.

Various controllers and/or actuators of subsystems 108 may receive data from one or more sensors, ADAS sensors 110, or vehicle computers 105 via the vehicle network 114. Vehicles 100 typically include a variety of actuators and sensors to detect internal states of actuated devices of the vehicle 100, for example, wheel speed, wheel orientation, and engine and transmission variables. Other actuators may control the status of various components, such as ignition switch status, audio volume status, etc. Often, but not necessarily, an actuator includes a digital-to-analog converter to convert a digital control signal that can be provided from a digital computer, e.g., via a network, to an analog signal that is usable by an analog control device such as a relay or solenoid, and a sensor includes an analog-to-digital converter to convert an analog sensing signal to a digital signal that can be provided to a digital computer, e.g., via the network 114.

A vehicle network 114 is a network via which messages can be exchanged between various devices in vehicle 100. The vehicle computers 105 can be generally programmed to send and/or receive, via vehicle network 114, messages to and/or from other devices in vehicle 100 e.g., any or all of vehicle computers 105, off-road features 115, ADAS sensors 110, components, communications module 112, and subsystems 108 (HMI, etc.). Additionally, messages can be exchanged among various such other devices in vehicle 100 via the vehicle network 114. Further, as mentioned below, various controllers and/or actuators may receive and provide data to the vehicle computers 105. In some implementations, vehicle network 114 can be a network in which messages are conveyed via a vehicle 100 communications bus. For example, vehicle network 114 can include an Ethernet network, a controller area network (CAN) in which messages are conveyed via a CAN bus, or a local interconnect network (LIN) in which messages are conveyed via a LIN bus. In some implementations, vehicle network 114 can include a network in which messages are conveyed using other wired communication technologies and/or wireless communication technologies e.g., Ethernet, Wi-Fi, Bluetooth, Ultra-Wide Band (UWB), etc. Additional examples of protocols that may be used for communications over vehicle network 114 in some implementations include, without limitation, Media Oriented System Transport (MOST), Time-Triggered Protocol TTP, and FlexRay. In some implementations, vehicle network 114 can represent a combination of multiple networks, possibly of different types, that support communications among devices in vehicle 100. For example, vehicle network 112 can include a CAN in which some devices in vehicle 100 communicate via a CAN bus, and a wired or wireless local area network in which some device in vehicle 100 communicate according to Ethernet or Wi-Fi communication protocols.

The vehicle computers 105 and central computer 120 can communicate via a wide area network 116, for example the Internet or a cellular data network. Further, various computing devices discussed herein may communicate with each other directly, e.g., via direct radio frequency communications according to protocols such as BLUETOOTH or the like. For example, a vehicle 100 can include a communication module 112 to provide communications with devices and/or networks not included as part of the vehicle 100, such as GPS satellites 118, the wide area network 116, and/or other vehicles and infrastructure, for example. The communication module 112 can provide various communications, e.g., vehicle to vehicle (V2V), vehicle-to-infrastructure or everything (V2X) or vehicle-to-everything including cellular communications (CV2X) wireless communications cellular, dedicated short range communications (DSRC), etc., to another vehicle 100, to an infrastructure element typically via direct radio frequency communications and/or typically via the wide area network 116, e.g. to the central computer 120. The communication module 112 could include one or more mechanisms by which a vehicle computer 105 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, CV2X, and the like.

The central computer 120 may also be connected to a database (not shown) so that vehicle 100 may send or receive data to or from the database. This is sometimes referred to as a "cloud" storage.

Figure 2:
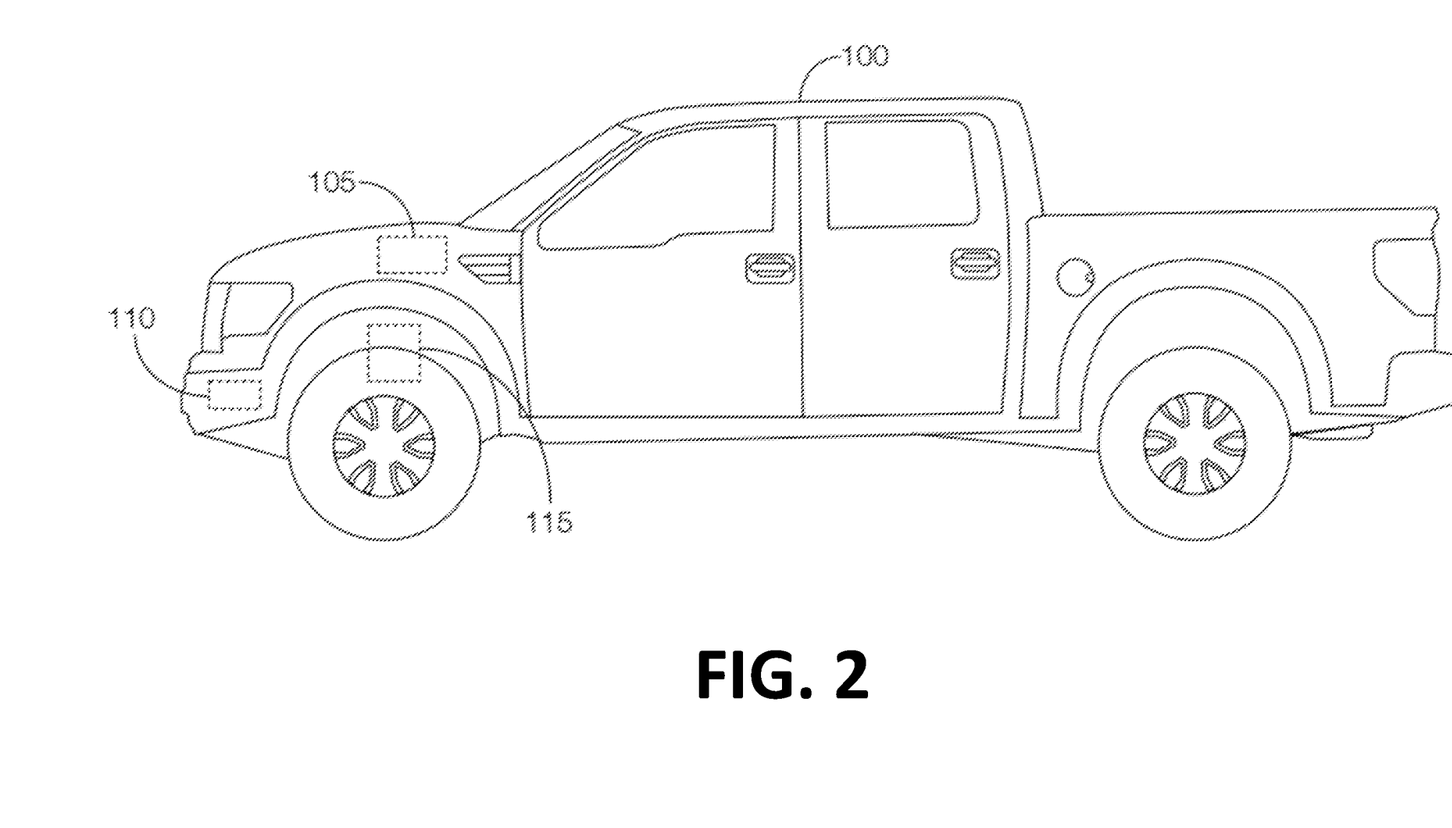
FIG. 2 illustrates an implementation of a vehicle with an off-road feature.

With reference to FIG. 2, an example of vehicle 100 is illustrated. Vehicle 100 includes at least one off-road feature 115 which may be engaged or disengaged by vehicle computer 105. The off-road feature 115 is illustrated schematically and may include, but is not limited to, a front stabilizer bar disconnect and/or a rear stabilizer bar disconnect, a rear-wheel steering or driving element to provide a crab mode (front and rear wheels steer the same), a four-wheel steering mode (where front and rear wheels steer opposite), or a tank turn mode (where left and right wheels rotate opposite), or a trail turn assist mode (where inside rear wheel brakes or rotates slower).

As discussed further below, the vehicle 100 also includes various ADAS sensors 110 to provide data to the vehicle computer 105. While ADAS sensors 110 are illustrated schematically in FIG. 2, they may include, but are not limited to, forward-looking cameras, side-looking cameras, reward-looking cameras, forward-facing ultrasonic sensors, side-facing ultrasonic sensors rear-facing ultrasonic sensors, forward-facing RADAR/LiDAR sensors, side-facing RADAR/LiDAR sensors rear-facing RADAR/LiDAR sensors. Depending on the availability and resolution of these sensors, one or more ADAS sensors may be used for object detection and/or tracking using existing algorithms. In particular, front-facing park-assist sensors (ultrasonic), RADAR/LiDAR, and cameras may provide useful data with respect to the type and condition of a track in front of vehicle 100, including the existence of large obstacles or holes.

Figure 3:
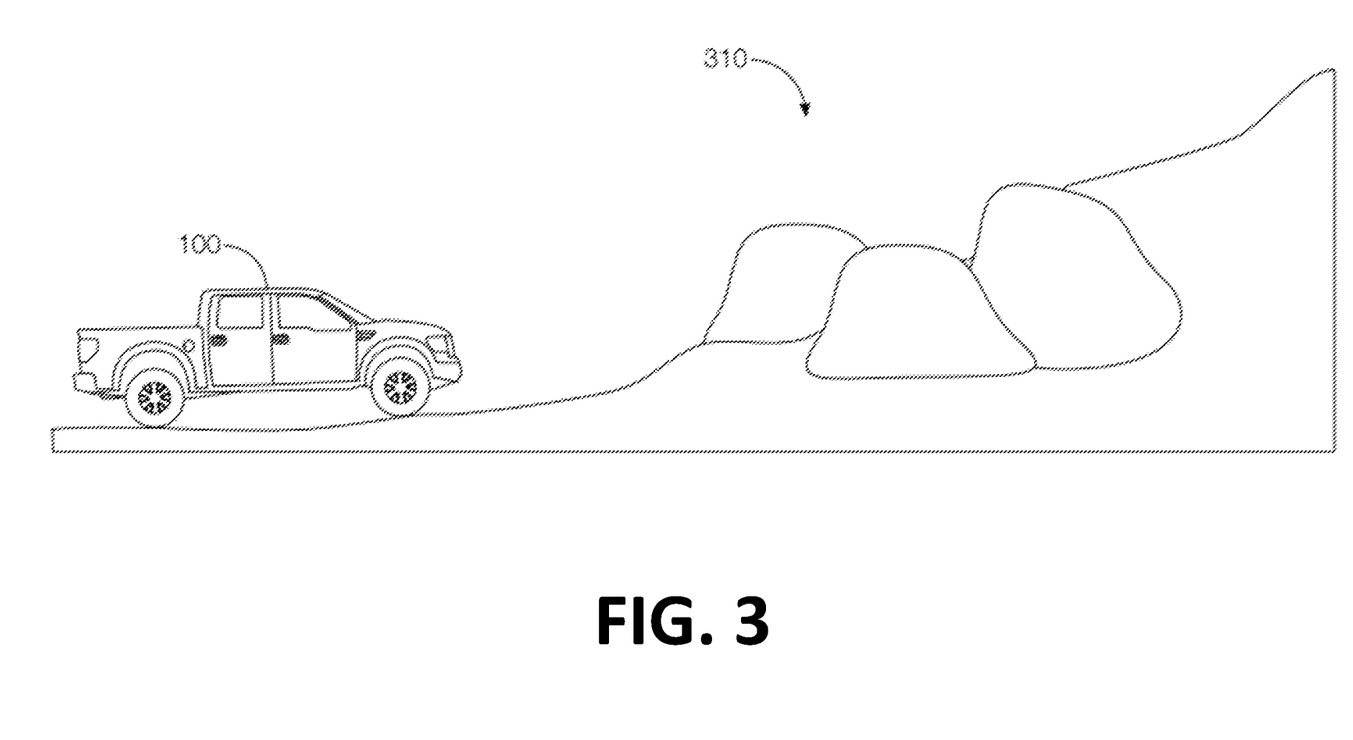
FIG. 3 illustrates an implementation of a vehicle with an off-road feature in an off-road area.

With reference to FIG. 3, a scenario 300 is illustrated in which vehicle 100 is in an off-road area 310 having a track that includes obstacles where an off-road feature 115 (see FIGS. 1 and 2) may be useful.

Figure 4:
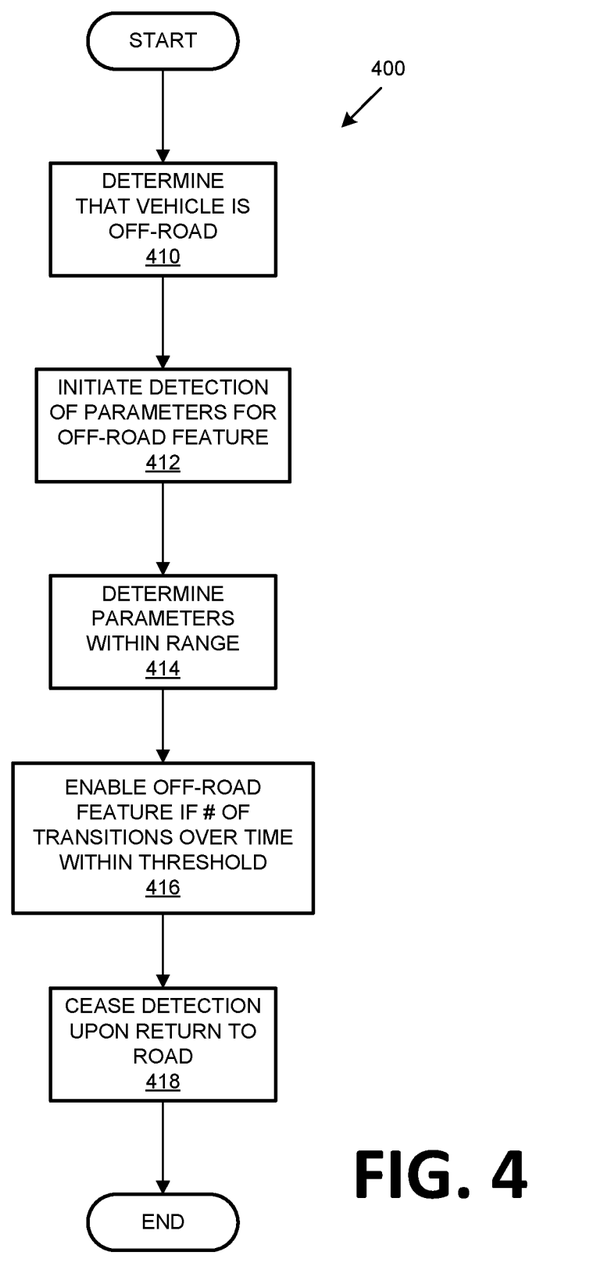
FIG. 4 a flow diagram of a process for off-road feature enablement.

With reference to FIG. 4, a flow diagram 400 of an implementation of the present disclosure is illustrated. In a first block 410, when vehicle 100 is in an off-road area 310 as illustrated in FIG. 3, the vehicle computer 105 may determine that it is in an off-road area, such as by use of communication module 112 and GPS satellite 118 to determine a geographic location and obtain data from a corresponding map or geographic database to indicate or otherwise determine that the vehicle 100 is in an off-road area 310. Additionally or alternatively, the cameras and other ADAS sensors 110 may provide sensing data to vehicle computer 105 to determine that the vehicle 100 is in an off-road area 310. For example, an ultrasonic parking assist sensor may detect an uneven surface, a forward-facing camera may fail to detect any lane lines and/or detect a forested scene, RADAR/LiDAR sensors may indicate an abundance of fixed obstacles, cameras etc. may detect steep pitches and sharp turns/obstacles indicative of an off-road area 310, and a digital map may indicate a likely path with curve radii in the off-road area 310.

Upon determining that the vehicle 100 is in an off-road area 310, vehicle computer 105 initiates detection of parameters that may be used to determine whether an off-road feature 115 should be enabled at block 412.

At block 414, the vehicle computer 105 determines whether the detected parameters are within a range for enablement of the off-road feature 115. In one or more implementations, the cameras and/or the digital map of the ADAS may be used to determine a likely path for the vehicle in the off-road area 301, as will be discussed later with respect to FIG. 6. In an implementation where the off-road feature 115 is a stabilizer bar disconnect to permit additional wheel articulation and/or user comfort, the detected parameters may include vehicle speed, path smoothness/roughness, and path curvature. For example, on a bumpy, straight path, the speed parameter range may be <100 kph. On a bumpy path with curves, the speed parameter range may be <70 kph. On a very tight or curvy track, the speed parameter range may be <30 kph. In an implementation where the off-road feature 115 is a crab mode, a tank turn mode, a four-wheel steering mode, or a trail turn assist mode to provide additional vehicle agility, the detected parameters may include vehicle speed, detected obstacles, and path curvature around the obstacles. For example, for these agility modes, the speed parameter may be <15 kph or <5 kph and may vary based upon the path complexity and number of objects to avoid.

At block 416, when the parameters are within range for enablement of the off-road feature 115, the computer 105 may enable the off-road feature if a number of transitions between an enabled state and a disabled state within a predetermined time is less than a transition threshold. For example, to limit the number of transitions between an enabled state and a disabled state to 5 within a 30 minute period, a transition threshold of 6 is set for a predetermined time of 30 minutes.

Certain advantages may result by only enabling the off-road feature 115 in response to the parameters being within a predetermined range based upon a number of transitions between an enabled state and a disabled state within a predetermined time being less than a transition threshold. In a first advantage, the elector/mechanical components implementing an off-road feature 115 may have a reduced duty cycle so as to prevent wear, excessive heating, and/or premature failure of the components. Another advantage is that the vehicle operator will have more consistent performance from the vehicle and not be constantly nagged with notifications of the feature being engaged/disengaged.

In an implementation that may prevent a constant enable/disable event near a parameter threshold, an initial threshold for enablement may be set different from a threshold for disablement. For example, on a bumpy, straight trail, a threshold speed for enablement may be <50 kph with a disablement threshold of >70 kph.

In a block 418, the vehicle computer may cease detection of the parameters for enablement of the off-road feature 115 upon determining that the vehicle 100 has moved from the off-road area 310 to an on-road area. For example, vehicle computer 105 may determine that it has moved from an off-road area to an on-road area by use of communication module 112 and GPS satellite 118 to determine a geographic location and obtain data from a corresponding map or geographic database to indicate or otherwise determine that the vehicle 100 is in an on-road area. Additionally or alternatively, the cameras and other ADAS sensors 110 may provide sensing data to vehicle computer 105 to determine that the vehicle 100 is in an on-road area. For example, an ultrasonic parking assist sensor may detect smooth paved surface, a forward-facing camera may detect lane lines and/or detect road signs, and a digital map may indicate and/or the cameras etc. may detect the multiple lanes and a straight, flat path indicative of an on-road area.

In use, the vehicle computer 105 will typically reset the number of transitions between an enabled state and a disabled state and a timer for the predetermined time period upon an expiration of a previous predetermined time period or upon determining the vehicle 100 has moved from an on-road area to an off-road area 310.

Figure 5:
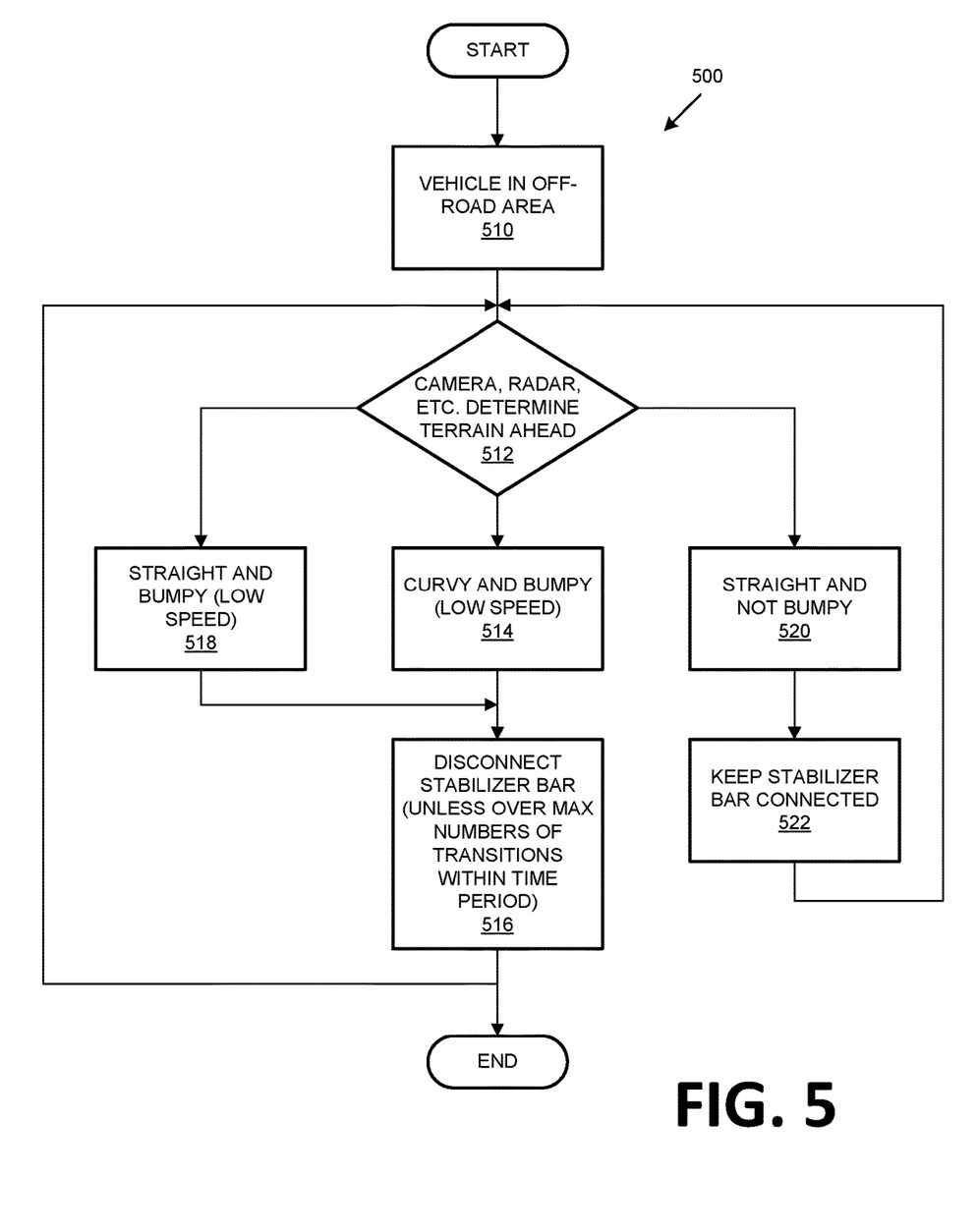
FIG. 5 is a flow diagram of details of the process for off-road feature enablement.

With respect to FIG. 5, a flow diagram 500 of an implementation of an example algorithm is illustrated for an off-road feature 115 of a stabilizer bar disconnect (front, rear, or both). In a first block 510, it is determined that the vehicle 100 is in an off-road area 310. The vehicle computer 105 may determine that it is in an off-road area by use of communication module 112 and GPS satellite 118 to determine a geographic location and obtain data from a corresponding map or geographic database to indicate or otherwise determine that the vehicle 100 is in an off-road area 310. Additionally or alternatively, the cameras and other ADAS sensors 110 may provide sensing data to vehicle computer 105 to determine that the vehicle 100 is in an off-road area 310. For example, an ultrasonic parking assist sensor may detect an uneven surface, a forward-facing camera may fail to detect any lane lines and/or detect a forested scene, RADAR/LiDAR sensors may indicate an abundance of fixed obstacles, the digital map may indicate and/or the cameras etc. may detect steep pitches and sharp turns/obstacles indicative of an off-road area 310.

In block 512, the ADAS sensors such as cameras, RADAR, etc. may be used to determine the terrain ahead of vehicle 100 (or behind if in reverse). The cameras and/or digital map of the ADAS may be used to determine a likely path for the vehicle in the off-road area 301.

If the terrain ahead of vehicle 100 is straight and bumpy enough that the vehicle is travelling at a low speed (e.g., <45 kph), at block 518, the vehicle computer 105 may disconnect the stabilizer bar by enabling the stabilizer bar disconnect at block 516 unless it is over the maximum number of transitions within the predetermined time period.

If the terrain ahead of vehicle 100 is curvy and bumpy enough that the vehicle is travelling at a low speed (e.g., <45 kph), at block 514, the vehicle computer 105 may disconnect the stabilizer bar by enabling the stabilizer bar disconnect at block 516 unless it is over the maximum number of transitions within the predetermined time period.

If the terrain ahead of vehicle 100 is straight and not bumpy (e.g., >45 kph), at block 520, the vehicle computer 105 may connect or keep the stabilizer bar connected by disabling the stabilizer bar disconnect at block 522 and return to detecting the terrain ahead at block 512.

Figure 6:
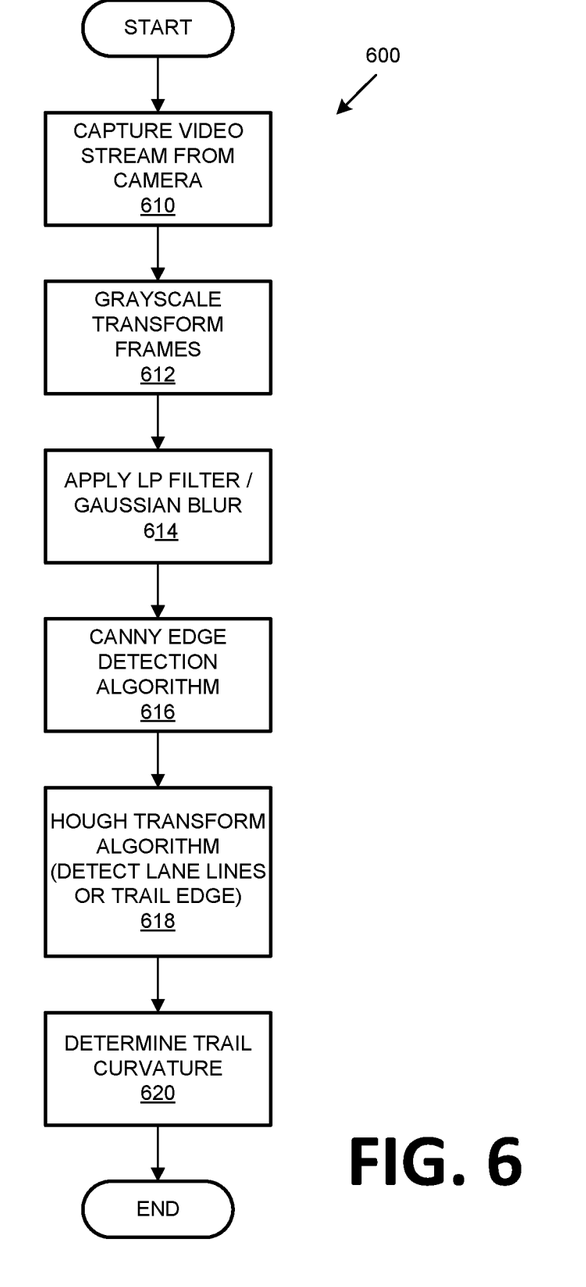
FIG. 6 is a flow diagram for an example process of detecting trail radius.

With respect to FIG. 6, a flow diagram 600 of an implementation of process for cameras or the like to determine a path in an off-road area 310 is illustrated.

In a first block 610, a video stream from a forward-facing camera is captured. A grayscale transform is applied to the frames of the captured video at clock 612. At block 614, a low-pass (LP) filter/Gaussian Blur is applied to the frame images. At block 616, images are subjected to a Canny edge detection algorithm or the like to provide high/low threshold values for possible "lane markings" which, when off-road will require thresholds at a level to detect an edge of a trail or track. A Hough transform algorithm is applied at block 618 to detect a trail edge. A curvature for the trail is then determined at block 620.

In addition to off-road area object detection using RADAR/LiDAR, video stream feeds from ADAS cameras may also be used with known image classification, image localization, object detection, and image segmentation techniques. An algorithm that would be useful for these tasks is the You Only Look Once (YOLO) algorithm that employs convolutional neural networks (CNN) to detect objects in real-time.

While a digital map and ADAS sensors on vehicle 100 have been described for determining an off-road track (curvature, bumpiness) and detecting objects, it is also possible to leverage this information or information related to where off-road features have been used by other as provided by other vehicles that has been shared to central computer 120 or shared to vehicle 100 via CV2V or CV2X communication.

A digital map is a set of map data that may include localization data. In the present context, map data is data stored in a memory accessible by a vehicle computer and/or ECUs in the vehicle. As will be appreciated, the digital map may be created from vehicle sensor data and/or based on prestored map data. Map data may include data specifying a feature corresponding to a location, e.g., specifying road or trail edges or boundaries, lanes, etc., as well as radii of curves and topographical information such that the computer can determine whether a location coordinate is on a road surface, shoulder, trail, etc. Map data further can include data specifying landmarks such as buildings, parks, bridges, etc., and their respective locations. Map data further can include data specifying locations, dimensions, poses, etc., of objects detected by vehicle sensors.

Localization data in the context of this document means (a) data that measures or indicates a position, location, and/or pose of a vehicle 102 or some other object according to some coordinate system and/or relative to some other object, and (b) data about a physical state of a vehicle 102. For example, localization data could include a vehicle 102 location, i.e., vehicle 102 location data, e.g., specifying geo-coordinates or the like for a current vehicle 102 location. Localization data could also include a distance of a vehicle 102 from some object, such as another vehicle 102, an intersection, a building, etc. Localization data could also include data about the pose of the vehicle 102 or some other object, i.e., an orientation of the vehicle 102 with respect to horizontal and/or vertical axes. The "physical state" of the vehicle 102 means a measurement or setting of the vehicle 102 describing or governing vehicle 102 movement. For example, a physical state of the vehicle 102 could include a vehicle 102 speed, acceleration, turn (or yaw) rate and/or heading, without limitation. A physical state of the vehicle 102 could further include settings such as a transmission setting (park, drive, reverse, etc.), a steering wheel angle, a state of engagement, e.g., brakes engaged or not engaged, etc. Further, references herein to a "location" of a vehicle 102 or some other object mean a place or position on a surface of the earth occupied by the object. A location can be specified according to a global coordinate system, e.g., geo-coordinates used by a Global Navigation Satellite System (GNSS), for example, sometimes referred to as GPS coordinates. A location could alternatively be specified relative to some other object, e.g., as a distance and/or heading with respect to the other object.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computing device for a vehicle comprising a processor and a memory, the memory storing instructions executable by the processor, the instructions including instructions to:

initiate detection of parameters for enablement of an off-road feature of the vehicle upon determining that the vehicle is in an off-road area, wherein the off-road feature is a stabilizer bar disconnect, a tank turn mode, or a crab mode;

enable the off-road feature in response to the parameters being within a predetermined range based upon a number of transitions between an enabled state and a disabled state within a predetermined time period being less than a transition threshold, wherein the number of transitions is at least two; and cease detection of the parameters for enablement of the off-road feature upon determining that the vehicle has moved from the off-road area to an on-road area.

2. The computing device of claim 1, further comprising instructions to:

determine that the vehicle is in an off-road area based upon a location of the vehicle and sensed terrain characteristics at the location.

3. The computing device of claim 1, wherein the off-road feature is the stabilizer bar disconnect, the instructions further including instructions to:

enable the stabilizer bar disconnect based upon the parameters of a speed of the vehicle and a radius of an off-road track in front of the vehicle.

4. The computing device of claim 3, wherein the radius of the off-road track in front of the vehicle is determined by a camera and/or a digital map.

5. The computing device of claim 2, wherein the sensed terrain characteristics at the location are from at least one of a camera on the vehicle, a short range radar on the vehicle, an ultrasonic sensor on the vehicle, and/or vehicle to vehicle (V2V) or vehicle to infrastructure (V2X) data from another vehicle.

6. The computing device of claim 1, wherein the off-road feature is the tank turn mode or the crab mode, the instructions further including instructions to:

enable the tank turn mode or crab mode based upon a speed of the vehicle, a radius of an off-road track in front of the vehicle, and obstacles in the off-road track.

7. The computing device of claim 6, wherein the radius of the off-road track in front of the vehicle is determined by a camera and/or a digital map.

8. The computing device of claim 6, wherein the obstacles in the off-road track are determined by object detection from at least one of a camera on the vehicle, an ultrasonic sensor on the vehicle, and/or vehicle to vehicle (V2V) or vehicle to infrastructure (V2X) data from another vehicle.

9. The computing device of claim 1, the instructions further including instructions to:

disable the off-road feature in response to the parameters being outside the predetermined range.

10. The computing device of claim 1, the instructions further including instructions to:

reset the number of transitions between an enabled state and a disabled state and a timer for the predetermined time upon an expiration of the predetermined time or upon determining the vehicle has moved from an on-road area to an off-road area.

11. A method for providing an off-road feature of a vehicle, comprising:

initiating detection of parameters for enablement of the off-road feature of the vehicle upon determining that the vehicle is in an off-road area, wherein the off-road feature is a stabilizer bar disconnect, a tank turn mode, or a crab mode;

enabling the off-road feature in response to the parameters being within a predetermined range based upon a number of transitions between an enabled state and a disabled state within a predetermined time being less than a transition threshold, wherein the number of transitions is at least two; and ceasing detection of the parameters for enablement of the off-road feature upon determining that the vehicle has moved from the off-road area to an on-road area.

12. The method of claim 11, further comprising:

determining that the vehicle is in the off-road area based upon a location of the vehicle and sensed terrain characteristics at the location.

13. The method of claim 11, wherein the off-road feature is the stabilizer bar disconnect, and further comprising enabling the stabilizer bar disconnect based upon the parameters of a speed of the vehicle and a radius of an off-road track in front of the vehicle.

14. The method of claim 13, further comprising determining the radius of the off-road track in front of the vehicle with a camera and/or a digital map.

15. The method of claim 12, wherein the sensed terrain characteristics at the location are from at least one of a camera on the vehicle, a short range radar on the vehicle, an ultrasonic sensor on the vehicle, and/or vehicle to vehicle (V2V) or vehicle to infrastructure (V2X) data from another vehicle.

16. The method of claim 11, wherein the off-road feature is the tank turn mode or the crab mode, and further comprising enabling the tank turn mode or crab mode based upon a speed of the vehicle, a radius of an off-road track in front of the vehicle, and obstacles in the off-road track.

17. The method of claim 16, comprising determining the radius of the off-road track in front of the vehicle with a camera and/or a digital map.

18. The method of claim 16, comprising sensing the obstacles in the off-road track with at least one of a camera on the vehicle, an ultrasonic sensor on the vehicle, and/or vehicle to vehicle (V2V) or vehicle to infrastructure (V2X) data from another vehicle.

19. The method of claim 11, further comprising disabling the off-road feature in response to the parameters being outside the predetermined range.

20. The method of claim 11, further comprising:

resetting the number of transitions between an enabled state and a disabled state and a timer for the predetermined time upon an expiration of the predetermined time or upon determining the vehicle has moved from an on-road area to an off-road area.

* * * * *